(12) United States Patent
Ellul et al.

(10) Patent No.: US 7,655,727 B2
(45) Date of Patent: Feb. 2, 2010

(54) METHOD FOR PREPARING THERMOPLASTIC VULCANIZATES WITH IMPROVED EXTRUSION SURFACES

(75) Inventors: Maria D. Ellul, Silver Lake Village, OH (US); Jianya Cheng, Fairlawn, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 391 days.

(21) Appl. No.: 11/297,937

(22) Filed: Dec. 9, 2005

(65) Prior Publication Data

US 2007/0135571 A1  Jun. 14, 2007

(51) Int. Cl.
*C08J 3/18* (2006.01)
*C08J 3/20* (2006.01)
*C08J 3/24* (2006.01)

(52) U.S. Cl. ..................... 525/133; 525/197
(58) Field of Classification Search ............ 525/88, 525/133, 197
See application file for complete search history.

(56) References Cited

U.S. PATENT DOCUMENTS

| | | | |
|---|---|---|---|
| 4,130,535 A | 12/1978 | Coran et al. | |
| 4,311,628 A | 1/1982 | Abdou-Sabet et al. | |
| 4,594,390 A | 6/1986 | Abdou-Sabet et al. | |
| 5,374,387 A * | 12/1994 | Barnes et al. | 264/211.23 |
| 6,121,383 A * | 9/2000 | Abdou-Sabet et al. | 525/192 |
| 6,147,160 A | 11/2000 | Wang et al. | |
| 7,019,087 B2 | 3/2006 | Mauk et al. | |
| 2004/0171758 A1* | 9/2004 | Ellul et al. | 525/192 |
| 2007/0265387 A1* | 11/2007 | James et al. | 524/502 |

FOREIGN PATENT DOCUMENTS

| | | |
|---|---|---|
| EP | 0 768 156 B1 | 4/1997 |
| EP | 0 775 718 A2 | 5/1997 |
| GB | 1 537 240 | 12/1978 |
| JP | 07 033916 | 7/1993 |
| JP | 07 33916 A | 2/1995 |
| WO | 01/42401 A1 | 6/2001 |
| WO | 03/016358 | 2/2003 |
| WO | 03/059963 | 7/2003 |
| WO | 03/059963 A1 | 7/2003 |

OTHER PUBLICATIONS

Section Ch, Week 199515 Dement Publications Ltd.,, London, GB; Class A18, an 1995-110745 XP002383146.
"*NORDEL® MG—The Game Changer . . . for TVP*", TPE, 2003, Brussels, Belgium, p. 59-71, Sep. 16-17, (2003).
R. T. Johnston, et al, "*The Effect of Gas Phase Polymerized EPDM Particle Size and Structure on Crystallinity*", 168th Technical Meeting of Rubber Division, Amer. Chem. Soc., Pittsburg, PA, p. 1-28, Nov. 1-3, (2005).

* cited by examiner

*Primary Examiner*—Jeffrey C Mullis

(57) ABSTRACT

A process for the preparation of dynamically vulcanized thermoplastic elastomers comprising melt processing under shearing conditions in melt reaction extruder, A) at least one thermoplastic resin, B) at least one vulcanizable gas-phase elastomer having a Mooney viscosity (ML$_{1+4}$(125° C.)) of from about 65 to about 450, C) a curing agent or agents, and D) process oil, wherein said process oil D) is added to the extruder in at least three oil injection positions located a) at least one location before or within the first 15% of the total length of the extruder; b) at least one other location prior to, at or within 10% total extruder length after the onset of the vulcanization of said gas-phase elastomer; and c) at least one location subsequent to the location of the point at which the vulcanization of said gas-phase elastomer is substantially completed.

11 Claims, 1 Drawing Sheet

METHOD FOR PREPARING THERMOPLASTIC VULCANIZATES WITH IMPROVED EXTRUSION SURFACES

BACKGROUND OF THE INVENTION

1. Field of the Invention

This invention relates to a process for preparing thermoplastic vulcanizates (TPV) using granular gas phase ethylene-propylene-diene terpolymer.

2. Description of the Related Art

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic. These rubber particles are crosslinked to promote elasticity. Thermoplastic vulcanizates are conventionally produced by dynamic vulcanization, which is a process whereby a rubber is cured or vulcanized within a blend with at least one non-vulcanizing polymer while the polymers are undergoing mixing or masticating at some elevated temperature, above the melt temperature of the non-vulcanizing polymer. See, for example U.S. Pat. Nos. 4,130,535, 4,311,628, 4,594,390 and 6,147,160.

Granular gas phase ethylene-propylene-diene terpolymer (EDPM) thermoplastic vulcanizates are known, see EP 0 775 718, and "NORDEL® MG—The Game Changer . . . for TPV," TPE 2003, Brussels, Belgium—16-17 Sep. 2003. As noted in these descriptions, granular gas phase EPDM rubber (GPR) presents an advantage over solution or slurry polymerized EPDM rubber in that the GPR is in a granular form upon exit from the gas phase reactor such that it is in a preferred form for introduction to plastic compounding equipment. Carbon black, or other filler, is added in the gas phase reactor to prevent rubber particle agglomeration and sticking to reactor walls, valves, piping, and the like. This forms the particulate GPR. The solution or slurry polymerized EPDM rubber, upon exit from its respective reactor must have excess solvent or reaction medium removed, after which the rubber is in bulk form. It is then often shipped to a compounder in bale form. The bale must thereafter be pre-compounded into particulate form, such as crumb, often with addition of some filler or powder, etc., as a partitioning agent to inhibit the inherent tendency of the rubber crumb to agglomerate before it is suitable for feeding into the compounding equipment. This is typically true in the preparation of conventional TPV compositions.

Conventionally produced TPV compositions also often include carbon black as a filler, where a black color is desired or is acceptable. Although carbon black is typically added to the composition prior to dynamic vulcanization, conventional wisdom suggests that the carbon black becomes primarily incorporated into the plastic matrix of the TPV. As a result, the advantages associated with carbon black, such as the UV stability, are not believed to be fully realized in the rubber phase. GPR avoids this, and includes the carbon black principally in the rubber phase. See WO 03/059963. This document as well notes that high molecular weight rubber, very high Mooney viscosities, can be prepared by this process. Such high molecular weight rubber can be advantageously used in TPV compositions and are thus highly desirable.

Very high molecular weight EPDM rubber can be very hard to manufacture and process. As is well known in the art of EPDM rubber, the ease of processing goes down significantly with significant increase in molecular weight. Often such EPDM is thus oil extended. This creates a problem where the choice of processing oil is taken from the compounder and the best choice for a given TPV product may be compromised. But with GPR, processing oil is added in the TPV reactive melt processing and may be selected and appropriate in view of the choice of thermoplastic resin and other additives. A proposed preparation of TPV compositions from GPR, including adding oil in TPV processing using the high Mooney embodiments, is described in the TPE Paper, supra.

Because the number of uses of thermoplastic vulcanizates is increasing, the performance demands that are placed on these materials is more demanding, and the manufacturing efficiency of the materials is continually pursued, there exists a need to overcome some of the shortcomings associated with the prior methods of manufacture.

SUMMARY OF THE INVENTION

In general the present invention provides a process for the preparation of dynamically vulcanized thermoplastic elastomers comprising melt processing under shearing conditions in melt reaction extruder, A) at least one thermoplastic resin, B) at least one vulcanizable gas-phase elastomer having a Mooney viscosity ($ML_{1+4}$(125° C.)) of from about 65 to about 450, C) a curing agent or agents, and D) process oil, wherein said process oil D) is added to the extruder in at least three oil injection positions located a) at least one location before or within the first 15% of the total length of the extruder; b) at least one other location prior to, at or just after the onset of the vulcanization of said gas-phase elastomer; and c) at least one location subsequent to the location of the point at which the vulcanization of said gas-phase elastomer is substantially completed; wherein the direct oil injection locations into the extruder are positioned at or immediately before one or more distributive mixing elements, which distributive mixing elements are immediately followed by one or more dispersive mixing elements.

The present invention further provides a process according to the description above wherein 5-24 phr oil is added in a), 16-65 phr oil is added in b), and 40-145 phr oil is added in c), and wherein the total amount of oil added in a)-c) is less than or equal to 160 phr oil, where "phr" means parts by weight per hundred parts by weight rubber.

By use of the invention process described, particularly smooth and efficient processing of gas phase rubber (GPR) is made possible while enabling the production of TPV products having surprisingly improved surface smoothness and improved appearance, while retaining excellent engineering and elastomeric properties, as is often highly desirable in the products to be produced by extrusion forming from the TPV products. Thus an extrusion formed article of commerce comprising a dynamically vulcanized thermoplastic elastomer containing at least one thermoplastic resin, at least one vulcanized gas-phase elastomer having a Mooney viscosity ($ML_{1+4}$(125° C.)) of from about 65 to about 450, and process oil, wherein said thermoplastic elastomer has a surface roughness of less than 120 ESR (as defined in the Examples below) and a surface spot count less than 60 can be obtained using the described process.

BRIEF DESCRIPTION OF THE DRAWINGS

The invention may take physical form in certain parts and arrangement of parts, at least one embodiment of which will be described in detail in this specification and illustrated in the accompanying drawings which form a part hereof and wherein.

DESCRIPTION OF THE INVENTION

Figure 1:
FIG. 1 is a perspective view of a set of ZME mixing elements which serve as distributive mixing elements.

The thermoplastic elastomers prepared by the process of this invention comprise a blend of at least one vulcanizable GPR and at least one non-vulcanizing thermoplastic polymer or resin. The GPR is in particulate, granular form having inert filler material such as carbon black evenly dispersed in and on the particles. The GPR polymeric units, preferably derived from ethylene, one or more α-olefins, particularly propylene, and optionally one or more diene monomers, are polymerized by using gas-phase polymerization techniques.

The α-olefins may include, but are not limited to, the preferred propylene, 1-butene, 1-hexene, 4-methyl-1 pentene, 1-octene, 1-decene, or combinations thereof. In one embodiment, the α-olefins are propylene, 1-hexene, 1-octene, or combinations thereof.

The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene, divinyl benzene, and the like, or a combination thereof. In preferred embodiments, the diene monomers are 5-ethylidene-2-norbornene and/or 5-vinyl-2-norbornene. In the event that the copolymer is prepared from ethylene, α-olefin, and diene monomers, the copolymer may be referred to as a terpolymer (EPDM rubber) or even a tetrapolymer in the event that multiple α-olefins or dienes, or both, are used (EAODM rubber). As used herein, the term "copolymer" shall mean polymers comprising two or more different monomers.

The elastomeric copolymers contain from about 15 to about 90 mole percent ethylene units deriving from ethylene monomer. In one embodiment, these copolymers contain from about 40 to about 85 mole percent, and in another embodiment, from about 50 to about 80 mole percent, ethylene units. Furthermore, where the copolymers contain diene units, the diene units can be present in an amount from about 0.1 to about 5 mole percent, or from about 0.2 to about 4 mole percent, or from about 1 to about 2.5 mole percent. The balance of the copolymer will generally be made up of units deriving from α-olefin monomers. Accordingly, the copolymer may contain from about 10 to about 85 mole percent, or from about 15 to about 50 mole percent, or from about 20 to about 40 mole percent, α-olefin units deriving from α-olefin monomers. The foregoing mole percentages are based upon the total moles of the polymer.

Elastomeric copolymers employed in this invention can be synthesized in a gas-phase fluidized bed reactor, as disclosed in U.S. Pat. Nos. 4,379,558, 4,383,095, 4,521,566, 4,876,320, 4,994,534, 5,317,036, 5,453,471, 5,648,442, 6,228,956, and 6,028,140, which are incorporated herein by reference. They can likewise be synthesized in a gas-phase stirred reactor as disclosed in U.S. Pat. No. 3,256,263, which is incorporated herein by reference. These gas-phase polymerization processes can be conducted in the condensed mode, induced condensed mode, or liquid monomer mode, all of which are known in the art.

The catalyst employed to polymerize the ethylene, α-olefin, and diene monomers into elastomeric copolymers can include both traditional Ziegler-Natta type catalyst systems, especially those including vanadium compounds, as disclosed in U.S. Pat. No. 5,783,645, as well as metallocene catalysts, which are also disclosed in U.S. Pat. No. 5,756,416. Other catalysts systems such as the Brookhart catalyst system may also be employed.

In one embodiment, the elastomeric copolymers are produced in the presence of an inert particulate matter such as carbon black, silica, clay, talc, or the like, as described in U.S. Pat. No. 4,994,534, which is incorporated herein by reference. The inert particulate material can be carbon black.

In one embodiment, the gas-phase elastomeric copolymers have a weight average molecular weight ($M_w$) that is greater than about 200,000, or from about 300,000 to about 1,000,000, or from about 400,000 to about 900,000, or from about 500,000 to about 700,000. These copolymers have a number average molecular weight ($M_n$) that is greater than about 80,000, or from about 100,000 to about 350,000, or from about 120,000 to about 300,000, or from about 130,000 to about 250,000. Typically $M_w$ and $M_n$ can be characterized by GPC (gel permeation chromatography) is accordance with known methods. The use of gas-phase elastomeric copolymers allows high molecular weight copolymer, as described above, to be employed without oil extension.

In one embodiment, the gas-phase elastomeric copolymers have a Mooney Viscosity ($ML_{1+4}$ @125° C.) of from about 65 to about 450, or from about 80 to about 380, or from about 80 to about 200, where the Mooney Viscosity is that of the neat polymer. That is, for the purposes of the description and claims, the Mooney Viscosity is measured on non-oil extended rubber, or practically, from the reactor prior to oil extension.

The gas-phase elastomeric copolymers are granular. The particle size of the granules is from about 0.1 to about 1.0 mm, or from about 0.5 to about 0.9 mm, or from about 0.6 to about 0.8 mm.

Because an inert particulate material is employed during the gas-phase synthesis of the elastomeric copolymers, the resulting elastomeric copolymer granules will contain dispersed therein or coated thereon the inert particulate material. In one embodiment, where carbon black is employed as the inert particulate material, the resulting elastomeric copolymer granules will include from about 10 to about 40 parts by weight carbon black per 100 parts by weight rubber, or from about 12 to about 30 parts by weight carbon black per 100 parts by weight rubber, or from about 15 to about 25 parts by weight carbon black per 100 parts by weight rubber.

The elastomer phase of the TPV composition that can be prepared according to the invention may include traditional rubbery polymers that are capable of crosslinking, or vulcanization. Thus copolymers of ethylene, propylene, and optionally, diene monomers, EPR or EPDM, may be Ziegler-Natta catalyst prepared, and, or metallocene catalyst, by traditional solution or slurry polymerization processes. Thus they can be of ethylene, propylene, and ethylidene norbornene and/or vinyl norbornene, and have a broad molecular weight distribution or polydispersity (MWD) of some Ziegler-Natta polymerization, e.g., 4-11, or narrow MWD of, for example 2-3, more typical of metallocene catalysts. Typically preferred catalysts for the copolymerization GPR are the single site Ziegler Natta catalysts, such as vanadium compounds, or the metallocene catalysts for Group 3-6 metallocene catalysts, particularly the bridged mono- or biscyclopentadienyl metallocenes.

The thermoplastic polymer component includes a solid, generally high molecular weight polymeric plastic material, which may be referred to as a thermoplastic resin. This resin is a crystalline or a semi-crystalline polymer, and can be a resin that has a crystallinity of at least 25 percent as measured by differential scanning calorimetry. Polymers with a high glass transition temperature are also acceptable as the thermoplastic resin. The melt temperature of these resins should be lower than the decomposition temperature of the rubber. Reference to a thermoplastic resin will include a thermoplastic resin or a mixture of two or more thermoplastic resins.

The thermoplastic resins have a weight average molecular weight ($M_w$) from about 200,000 to about 700,000, and a number average molecular weight ($M_n$) from about 80,000 to about 200,000. These resins may have a $M_w$ from about 300,000 to about 600,000, and a $M_n$ from about 90,000 to about 150,000.

Preferred polyolefinic thermoplastic resins generally have a melt temperature ($T_m$) that is from about 150 to about 175° C., or from about 155 to about 170° C., or from about 160 to about 170° C. The glass transition temperature ($T_g$) of these resins is from about −5 to about 10° C., or from about −3 to about 5° C., or from about 0 to about 2° C. The crystallization temperature ($T_c$) of these resins is from about 95 to about 130° C., or from about 100 to about 120° C., or from about 105 to about 115° C. as measured by DSC and cooled at 10° C./min.

The thermoplastic resins generally have a melt flow rate that is less than about 10 dg/min, or less than about 2 dg/min, or less than about 0.8 dg/min. Melt flow rate is a measure of how easily a polymer flows under standard pressure, and is measured by using ASTM D-1238 at 230° C. and 2.16 kg load.

Exemplary thermoplastic resins include crystalline or semi-crystalline, or crystallizable, polyolefins, polyimides, polyesters (nylons), poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics. In one embodiment, the thermoplastic resins are crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

In a preferred embodiment, the thermoplastic resin is high-crystalline isotactic or syndiotactic polypropylene. These propylene polymers include both homopolymers of propylene, or copolymers with 0.1-20 wt. % percentage of ethylene, or $C_4$-$C_8$ comonomers, and blends of such polypropylenes. The polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be used. These polypropylene resins are characterized by a melt flow rate that is less than or equal to 10 dg/min or less than or equal to 1.0 dg/min per ASTM D-1238.

Any curative agent that is capable of curing or crosslinking the elastomeric copolymer may be used. Some non-limiting examples of these curatives include phenolic resins, peroxides, maleimides, and silicon-containing curatives.

Any phenolic resin that is capable of crosslinking a rubber polymer can be employed in practicing the present invention. U.S. Pat. Nos. 2,972,600 and 3,287,440 are incorporated herein in this regard. The phenolic resin curatives can be referred to as resole resins and are made by condensation of alkyl substituted phenols or unsubstituted phenols with aldehydes, which can be formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms can be used. These phenolic curatives are typically thermosetting resins and may be referred to as phenolic resin curatives or phenolic resins. These phenolic resins are ideally used in conjunction with a catalyst system. For example, non-halogenated phenol curing resins are used in conjunction with halogen donors and, optionally, a hydrogen halide scavenger. Where the phenolic curing resin is halogenated, a halogen donor is not required but the use of a hydrogen halide scavenger, such as ZnO, can be used. For a further discussion of phenolic resin curing of thermoplastic vulcanizates, reference can be made to U.S. Pat. No. 4,311,628, and U.S. Patent Application No. 2004/017158 A1, both of which are incorporated by reference.

Peroxide curatives are generally selected from organic peroxides. Examples of organic peroxides include, but are not limited to, di-tert-butyl peroxide, dicumyl peroxide, t-butyl-cumyl peroxide, α,α-bis(tert-butylperoxy)diisopropyl benzene, 2,5 dimethyl 2,5-di(t-butylperoxy)hexane, 1,1-di(t-butylperoxy)-3,3,5-trimethyl cyclohexane, benzoyl peroxide, lauroyl peroxide, dilauroyl peroxide, 2,5-dimethyl-2,5-di (tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Coagents such as triallylcyanurate are typically employed in combination with these peroxides. Coagent combinations may be employed as well. For example, combinations of high-vinyl polydienes and α-β-ethylenically unsaturated metal carboxylates are useful, as described in U.S. Ser. No. 11/180,235, filed 13 Jul. 2005, which is incorporated herein by reference. Coagents may also be employed a neat liquids or together with a carrier. For example, the multi-functional acrylates or multi-functional methacrylates together with a carrier are useful, as disclosed in U.S. Ser. No. 11/246,773, filed 7 Oct. 2005, which is also incorporated herein by reference. Also, the curative and/or coagent may be pre-mixed with the plastic prior to formulation of the thermoplastic vulcanizate, as described in U.S. Pat. No. 4,087,485, which is incorporated by reference. For a further discussion of peroxide curatives and their use for preparing thermoplastic vulcanizates, reference can be made to U.S. Pat. No. 5,656,693, which is incorporated herein by reference. When peroxide curatives are employed, the elastomeric copolymer may include 5-vinyl-2-norbornene and 5-ethylidene-2-norbornene as the diene component.

Useful silicon-containing curatives generally include silicon hydride compounds having at least two SiH groups. These compounds react with carbon-carbon double bonds of unsaturated polymers in the presence of a hydrosilylation catalyst. Silicon hydride compounds that are useful in practicing the present invention include, but are not limited to, methylhydrogen polysiloxanes, methylhydrogen dimethylsiloxane copolymers, alkyl methyl polysiloxanes, bis(dimethylsilyl)alkanes, bis(dimethylsilyl)benzene, and mixtures thereof. An example of silicon hydride compounds is shown in U.S. Patent Application No. 2004/017158 A1, which is incorporated by reference.

As noted above, hydrosilylation curing of the elastomeric polymer is conducted in the presence of a catalyst. These catalysts can include, but are not limited to, peroxide catalysts and catalysts including transition metals of Group VIII. These metals include, but are not limited to, palladium, rhodium, and platinum, as well as complexes of these metals. For a further discussion of the use of hydrosilylation to cure thermoplastic vulcanizates, reference can be made to U.S. Pat. Nos. 5,936,028 6,251,998, and 6,150,464, which is incorporated herein by reference. When silicon-containing curatives are employed, the elastomeric copolymer employed can include 5-vinyl-2-norbornene as the diene component.

Another useful cure system is disclosed in U.S. Pat. No. 6,277,916 B1, which is incorporated herein by reference. These cure systems employ polyfunctional compounds such as poly(sulfonyl azides).

Extender oils of any sort, mineral oils, synthetic processing oils, or combinations thereof may be employed as plasticizers in the compositions of the present invention. The plasticizers may include, but are not limited to, aromatic, naphthenic, and paraffinic extender oils. Exemplary synthetic processing oils are low molecular weight polylinear $\alpha$-olefins, polybranched $\alpha$-olefins, particularly the poly-alpha-olefins. A commercial example are the SPECTRASYN® oils of ExxonMobil Chemical Co. The compositions of this invention may include plasticizers from organic esters, alkyl ethers, or combinations thereof. U.S. Pat. Nos. 5,290,886 and 5,397,832 are incorporated herein in this regard. Suitable esters include monomeric and oligomeric materials having an average molecular weight below about 2000, or below about 600. Esters found to be suitable were aliphatic mono- or diesters or alternatively oligomeric aliphatic esters or alkyl ether esters.

Generally, from about 5 to about 300 parts by weight, or from about 30 to about 250 parts by weight, or from about 70 to about 200 parts by weight, of plasticizer per 100 parts rubber is added. The quantity of plasticizer added depends upon the properties desired, with the upper limit depending upon the compatibility of the particular oil and blend ingredients; this limit is exceeded when excessive exuding of plasticizer occurs. The amount of ester plasticizer in the composition will generally be less than about 250 parts, or less than about 175 parts, per 100 parts rubber.

In certain embodiments of this invention, the thermoplastic vulcanizate may likewise include one or more polymeric processing additives or property modifiers. A processing additive that can be employed is a polymeric resin that has a very high melt flow index. These polymeric resins include both linear and branched molecules that have a melt flow rate that is greater than about 500 dg/min, or greater than about 750 dg/min, or greater than about 1000 dg/min, or greater than about 1200 dg/min, or greater than about 1500 dg/min. Melt flow rate is a measure of how easily a polymer flows under standard pressure, and is measured by using ASTM D-1238 at 230° C. and 2.16 kg load. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified. One type of linear polymeric processing additive is polypropylene homopolymers. One type of branched polymeric processing additive includes diene-modified polypropylene polymers. Thermoplastic vulcanizates that include similar processing additives are disclosed in U.S. Pat. No. 6,451,915, which is incorporated herein by reference.

Thermoplastics which can be added for property modification include additional noncrosslinkable elastomers, including non-TPV thermoplastics and thermoplastic elastomers. Examples include polyolefins such as polyethylene homopolymers and copolymers with one or more $C_3$-$C_8$ $\alpha$-olefins. Specific examples include ethylene-propylene rubber (EPR), ULDPE, VLDPE, LLDPE, HDPE, and particularly those polyethylenes commonly known as "plastomers" which are metallocene catalyzed copolymers of ethylene and $C_4$-$C_8$ having a density of about 0.870 to 0.920. Propylene based elastomeric copolymers of propylene and 8-20 weight % of ethylene, and having a crystalline melt point (60-120° C.) are particularly useful with a polypropylene based thermoplastic phase, for example the random propylene copolymers sold under the name VISTAMAXX® by Exxon Mobil Chemical Co. Other thermoplastic elastomers having some compatibility with the principal thermoplastic or GPR, may be added such as the hydrogenated styrene, butadiene and or isoprene, styrene triblock copolymers ("SBC"), such as SEBS, SEPS, SEEPS, and the like. Non-hydrogenated SBC triblock polymers where there is a rubbery mid-block with thermoplastic end-blocks will serve as well, for instance, styrene-isoprene-styrene, styrene-butadiene-styrene, and styrene-(butadiene-styrene)-styrene.

In addition to the thermoplastic resin, the thermoplastic elastomer, curatives, plasticizers, and any polymeric additive, the composition may also include reinforcing and non-reinforcing fillers, antioxidants, stabilizers, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black, as well as organic and inorganic nanoscopic fillers. Fillers, such as carbon black, can be added in combination with a carrier such as polypropylene. This invention provides the ability to add filler, such as carbon black, together with the rubber as well as together with a thermoplastic carrier such as polypropylene in a single-pass or one-step process.

Compositions of this invention can contain a sufficient amount of the elastomeric copolymer to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the thermoplastic elastomers of the present invention may comprise at least about 25 percent by weight elastomeric copolymer, or at least about 35 percent by weight elastomeric copolymer, or at least about 45 percent by weight elastomeric copolymer, or at least about 50 percent by weight elastomeric copolymer. More specifically, the amount of elastomeric copolymer within the thermoplastic vulcanizate is generally from about 25 to about 90 percent by weight, or from about 45 to about 85 percent by weight, or from about 60 to about 80 percent by weight, based on the entire weight of the thermoplastic vulcanizate.

In one embodiment, the elastomeric copolymer component of the thermoplastic elastomers will consist entirely of the gas-phase elastomeric copolymers. In other embodiments, the elastomeric copolymer component will include both gas-phase elastomeric copolymers as well as conventional elastomeric copolymers (e.g., solution-polymerized elastomeric copolymer rubber or slurry-polymerized elastomeric copolymer rubber). In these latter embodiments, the elastomeric copolymer component may include from about 10 to about 90 parts by weight of the gas-phase elastomeric copolymer and from about 90 to about 10 parts by weight of a conventional elastomeric copolymer, or from about 20 to about 80 parts by weight gas-phase elastomeric copolymer and from about 80 to about 20 parts by weight conventional elastomeric copolymer, or from about 30 to about 70 parts by weight gas-phase elastomeric copolymer and from about 70 to about 30 parts by weight conventional elastomeric copolymer, or from about 40 to about 60 parts by weight gas-phase elastomeric copolymer and from about 60 to about 40 parts by weight conventional elastomeric copolymer, or about 50 parts by weight gas-phase elastomeric copolymer and about 50 parts by weight conventional elastomeric copolymer, based on the entire weight of the elastomeric copolymer (or rubber component).

The thermoplastic elastomers can generally comprise from about 10 to about 80 percent by weight of the thermoplastic resin based on the total weight of the rubber and thermoplastic resin combined. The thermoplastic elastomers may comprise from about 10 to about 80 percent by weight, or from about 15 to about 60 percent by weight, or from about 20 to about 40 percent by weight, or from about 25 to about 35 percent by weight of the thermoplastic resin based on the total weight of the rubber and thermoplastic resin combined.

Where a phenolic resin curative is employed, a vulcanizing amount curative may comprise from about 1 to about 20 parts by weight, or from about 3 to about 16 parts by weight, or from about 4 to about 12 parts by weight, phenolic resin per 100 parts by weight rubber.

The skilled artisan will be able to readily determine a sufficient or effective amount of vulcanizing agent to be employed without undue calculation or experimentation. The amount of vulcanizing agent should be sufficient to at least partially vulcanize the elastomeric polymer, and the elastomeric polymer may be completely vulcanized.

Where a peroxide curative is employed, a vulcanizing amount of curative may comprise from about $1 \times 10^{-4}$ moles to about $4 \times 10^{-2}$ moles, or from about $2 \times 10^{-4}$ moles to about $3 \times 10^{-2}$ moles, or from about $7 \times 10^{-4}$ moles to about $2 \times 10^{-2}$ moles per 100 parts by weight rubber.

Where silicon-containing curative is employed, a vulcanizing amount of curative may comprise from 0.1 to about 10 mole equivalents, or from about 0.5 to about 5 mole equivalents, of SiH per carbon-carbon double bond.

When employed, the thermoplastic elastomers may generally comprise from about 1 to about 25 percent by weight of the polymeric processing and property modifier additives based on the total weight of the rubber and thermoplastic resin combined. In one embodiment, the thermoplastic elastomers comprise from about 1.5 to about 20 percent by weight, or from about 2 to about 15 percent by weight of the polymeric processing additive based on the total weight of the rubber and thermoplastic resin combined.

Fillers, such as carbon black or clay, may be added in amount from about 10 to about 250 parts by weight, per 100 parts by weight of rubber. The amount of carbon black that can be used depends, at least in part, upon the type of carbon black and the amount of extender oil that is used. The amount of extender oil depends, at least in part, upon the type of rubber. High viscosity rubbers are more highly oil extendable.

In the invention, the rubber is crosslinked by dynamic vulcanization. The term dynamic vulcanization refers to a vulcanization or curing process for a rubber contained in a thermoplastic elastomer composition, wherein the rubber is vulcanized under conditions of high shear mixing at a temperature above the melting point of the polyolefin component. The rubber is thus simultaneously crosslinked and dispersed as fine particles within the polyolefin matrix, although other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. A high shear method for preparing thermoplastic vulcanizates is described in U.S. Pat. No. 4,594,390, which is incorporated herein by reference, however methods employing low shear rates can also be used.

The order of addition of the additives is important in some regards, and not in others. Typically, initially, at least some of the thermoplastic is melt blended with the GPR, and processing oil, such that it becomes well mixed. The process oil is preferably heated before added into the extruder to enhance mixing. The amount of thermoplastic added in the initial melt blending step is at least that determined empirically sufficient to allow phase inversion, such that the initial blend becomes one of a continuous thermoplastic phase, and a discontinuous crosslinked rubber phase upon continued mixing with the addition of curing agent. The curing agent is typically added after effective blending has been achieved and with continued melt mixing to permit the dynamic crosslinking of the GPR. Phase inversion then occurs as the crosslinking of the GPR continues. The additional filler, processing aids, polymeric modifiers, etc., can be added prior to the addition of curative and initiation of crosslinking where such does not interfere with the crosslinking reaction, or after the crosslinking reaction is nearly complete where such may interfere. Additionally, the crosslinking reaction can be made more efficient where the thermoplastic, and other additives, are kept to low amounts, sufficient to allow phase inversion, but where the GPR and curative are added in sufficient amounts for crosslinking of the GPR under conditions that the concentration of GPR and curing agent are higher with respect to the overall reaction mixture. Then additional thermoplastic, and any additives, can be added after crosslinking of the GPR is complete, or at least nearly so.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired. Because the conventional elastomeric copolymers are not granular and do not include inert material as part of the manufacturing or synthesis of the polymer, additional process steps must be included to granulate or add inert material, if desired, to the conventional elastomeric copolymer. On the other hand, gas-phase elastomeric copolymers are granular and include particulate material, such as carbon black, and therefore the manufacture of thermoplastic vulcanizates from these elastomeric copolymers does not require, i.e., can be devoid of an elastomeric copolymer granulation step or a step of pre-dispersing inert material, such as carbon black, into the elastomeric copolymer.

Despite the fact that the rubber component is partially or fully cured, the compositions of this invention can be processed and reprocessed by conventional plastic processing techniques such as extrusion, injection molding, and compression molding. The rubber within these thermoplastic elastomers is usually in the form of finely-divided and well-dispersed particles of vulcanized or cured rubber, with well dispersed carbon black.

In the process of this invention, the process oil is added in three or more locations, wherein at least the first and second additions of oil take place prior to or just after the onset of vulcanization. In one embodiment, a first amount less than about 30 phr of process oil is added to the granular material before, at, or immediately after the time of feeding to the twin screw. The temperature in the extruder becomes hot enough to melt the polymeric components from the energy created by the shearing forces in the extruder, though some external heating can be added. The temperature tends to rise as the rubber is being vulcanized, and some external cooling may be needed, until about the time that the continuous phase of rubber with dispersed thermoplastic inverts, the rubber becomes substantially vulcanized, and begins to form dispersed cross-linked rubber particles. Oil is added again before, at or within 10% total extruder length ("L") after the onset of vulcanization. More is added as the rubber becomes substantially vulcanized but in at least one L/D ("D" is extruder diameter) after the earlier oil injection, and preferably from about the completion of the rubber vulcanization to as far as the end of the extruder. In all injections into the extruder the oil may be pre-heated prior to injection.

Thus in the process of the invention, the GPR (e.g., EPDM), thermoplastic polymer, and optionally a cure catalyst, are fed into the feedthroat of an extruder having twin screw extruder barrel(s). The first injection of oil can be at a location from the feed throat, with the other components, to a location at about 15% of L. Alternatively the first injection objectives can be wholly met, or partially, by the use of oil-extended GPR from premixing the GPR with oil before its introduction. This can be in an amount of 5 to about 25 phr of the process oil. A second injection is made after the first but not more than 10% L beyond the onset of vulcanization of the GPR in the extruder. In a preferred embodiment, the second addition of process oil at location b) contains at least about 25% of the total process oil to be added. Onset can be determined by removing samples from sampling ports, and subjecting to extraction in room temperature hexane, or other rubber extraction methods. Where the extractable amount of GPR is more than about 90% but less than 99% by weight total GPR, the dynamic vulcanization, or cross-linking, has passed onset. The curing agent, which may be mixed with additional oil, is added anywhere from the feed throat, up to just prior to where onset of vulcanization is to be established. Such typically would be selected as a point where there is a homogenous mixture of the original components and the oil, which can also be determined empirically by sampling. The oil is injected at a third location subsequent to the point at which the vulcanization of said gas-phase elastomer is substantially completed. The vulcanization of the GPR is substantially completed when not more than 15 wt. % of the total amount of GPR is extractable by rubber extraction methods. In a preferred embodiment, the total amount of process oil added is less than or equal to about 160 phr. In this embodiment, about 50% of the process oil is added prior to the c) location, and about 50% of the process oil is added at or after location c), or both.

In a process of the invention, the oil injection points into the extruder are positioned at or before one or more distributive mixing elements in the extruder, which distributive mixing element(s) is/are followed by one or more dispersive mixing elements. This arrangement particularly assists effective blending of the components for ease of processing and uniformity of the final extruded product. Additionally, it is particularly advantageous to add a liquid of oil diluted curative, or molten curative, through an injection port positioned in the same manner. The distributive element serves principally to effect homogeneous blending of one component with another and the dispersive mixing element serves principally to effect reduction in particle size of the dispersed phase material.

Figure 2:
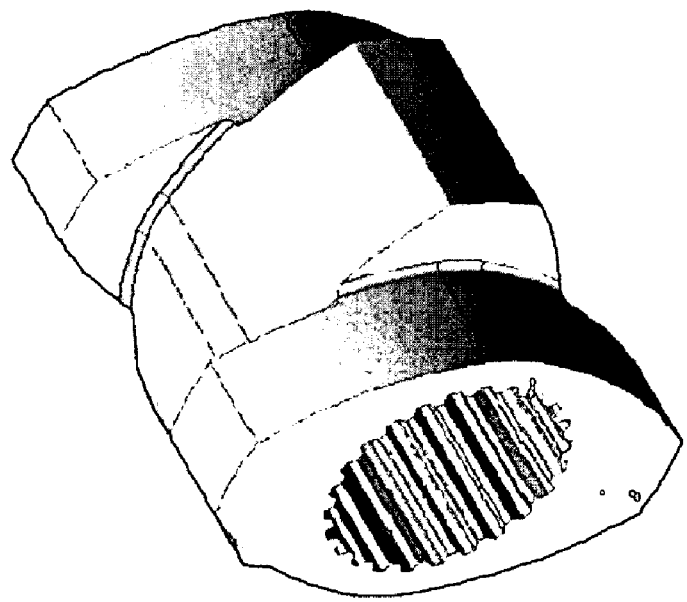
FIG. 2 is a perspective view of a neutral kneading element which serves as one dispersive mixing element.

FIGS. 1 and 2 provide non-limiting examples of typical elements used on extruder screws that provide the distributive and dispersive functions.

In another embodiments of this invention, the extruder could have multiple barrels, with different temperature ranges for the different barrels. In one embodiment of the invention, the following mixing elements are located after the addition of the curing agent: 3xZME 15/30, KB60/3/30, and KB60/3/60. In another embodiment, the following mixing elements are located after the addition of the curing agent: 3xZME20/40, KB60/3/45, and KB60/3/90. In these embodiments, two examples of suitable diameters of the extruder are 53 mm and 83 mm. In one embodiment of the invention, the following mixing elements are located after the addition of the process oil: ZME15/30, KB60/3/30, KB60/3/60, KB30/5/30, KB60/3/30, ZME15/30, and 2xKB60/3/30. For the larger diameter extruders, the following three mixing element combinations can be located after the addition of the process oil: (1) KB30/5/60; (2) KB60/3/45 and KB60/3/90; and, (3) ZME20/40, KB30/5/30, and 2xKB60/3/45. These extruder mixing elements, and others, and their functions are described in a publication from Coperion Corporation entitled "Processing Lines". vol. 9. No. 1, January 1999.

The thermoplastic elastomer of this invention is useful for making a variety of articles such as weather seals, hoses, belts, gaskets, moldings, boots, elastic fibers and like articles. They are useful for making articles by blow molding, extrusion, injection molding, thermo-forming, elastic-welding, compression molding techniques, and by extrusion foaming. More specifically, they are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's. Foamed articles, such as weather seal extrudates for the construction and vehicle manufacture industries, and for liquid carrying hoses, e.g., underhood automotive, are also particularly well suited.

The invention having been described, working examples are presented below to further illustrate the invention. Though several embodiments are presented, it will be apparent to those skilled in the art that the illustrated methods may incorporate changes and modifications without departing from the general scope of this invention. The invention includes all such modifications and alterations in so far as they come within the scope of the appended claims or the equivalents thereof. Thus, the scope of the invention includes all modifications and variations that may fall within the scope of the claims.

EXAMPLES

Materials

Thermoplastic vulcanizates were prepared by the invention process using the described components, in Table I, below:

TABLE I

| Abbreviation | Commercial Name | Chemical | Manufacturer/ Distributor |
|---|---|---|---|
| EPDM | Vistalon ® 3666 | Ethylene-propylene-ethylidene norbornene (oil = 75 phr), Mooney (ML 1 + 4, 125° C.) = 52, 64 wt. % ethylene, 4.5 wt. % ENB | ExxonMobil Chemical Co. |
| GPR I | Mega 8284 ELASTOFLO ® | Ethylene-propylene-ethylidene norbornene, Mooney (ML 1 + 4, 125° C.) = 80, 68 wt. % ethylene, 4.5 wt. % ENB, carbon black 18–30 phr | Union Carbide |
| GPR II | Mega 9315 ELASTOFLO ® | Ethylene-propylene-ethylidene norbornene, Mooney (ML 1 + 4, 125° C.) = 95 (Total Product (ML 1 + 4, 125° C. = 115), 64.5 wt. % ethylene, 3.5 wt. % ENB, carbon black, N650, 20 phr nominal | Union Carbide |
| GPR III | Nordel MG ® 47085 | Ethylene-propylene-ethylidene norbornene, Mooney (ML 1 + 4, 125° C.) = 85 (Total Product (ML 1 + 4, 125° C. = 100), 69.5 wt. % ethylene, 4.5 wt. % ENB, carbon black 30 phr, Mw = 184,000 g/mol | Dow Chemical Co. |
| GPR IV | Nordel MG ® 47130 | Ethylene-propylene-ethylidene norbornene, Mooney (ML 1 + 4, 125° C.) = 130, 67 wt. % ethylene, 4.9 wt. % ENB, carbon black 30 phr, Mw = 308,000 g/mol | Dow Chemical Co. |
| PP I | D008M | polypropylene homopolymer, MFR 0.8 dg/min | Aristech |
| PP II | FP230 | polypropylene homopolymer, MFR = 30 dg/min | Aristech |
| PP III | PP 3746G | polypropylene homopolymer, MFR = 1,200 dg/min | ExxonMobil Chemical Co. |
| PP IV | PP 51S07A | polypropylene homopolymer, MFR = 0.7 dg/min | Equistar |
| PP V | TR 477 | polypropylene homopolymer, MFR = 0.5 dg/min | Equistar |
| Process Oil | Sunpar 150M | paraffinic oil | SUNPAR |
| Curative I | SP 1045 | phenolic resin curing agent | Schenectady Int. |
| Curative II | SMD 31214 | phenolic resin curing agent (oil dilution) | Schenectady Int. |
| Zinc Oxide | Kadox911 | Zinc Oxide | Zinc Corp. Of America |
| Stannous Chloride | Stannous Chloride | Stannous Chloride | Mason Corp. |
| Filler | Icecap K Clay | Clay | Burgess |
| Wax | Okerin Wax | Paraffinic wax | Okerin |
| Black | Ampacet Black | Carbon black and polypropylene concentrate | Ampacet |

General Process Description

For the following examples, of Tables II(a) and II(b), either gas-phase rubber or conventional EPDM was fed into the feed throat of a Coperion ZSK twin screw extruder (Coperion ZSK 53, L/D (length of extruder over its diameter) of 43, for both Tables Ia and IIb of examples). For comparative, non-invention examples the letter "C" follows the example number. In the examples one or more thermoplastic resins was also fed into feed throat along with other reaction rate control agents such as zinc oxide and stannous chloride. Filler such as clay was also added into the feed throat. The rubber and thermoplastic resin were mixed and softened or melted in early section of the extruder. The reaction rate control agents were mixed into rubber primarily. Clay filler was also mixed with rubber and thermoplastics. Process oil was injected into the extruder at three different locations (in L/D measurement) along the extruder as described below. The curative was injected into the extruder after rubber and thermoplastics commenced blending. Rubber crosslinking reactions were initiated and accelerated either by temperature or catalysts or both. During the crosslinking reactions, a typical phase inversion occurred from an essentially continuous phase of molten rubber and dispersed phase molten thermoplastic. Rubber phase was changed from a continuous phase to a dispersed phase of crosslinked rubber particles, while the thermoplastic was changed from dispersed phase to continuous phase.

The ingredients used in the examples are described in Table I together with physical testing that was performed on Samples. Each was were molded at 190° C. for property testing. In addition to the ingredients set forth in Table II (a), each thermoplastic vulcanizate included 42.78 parts by weight clay per 100 parts by weight rubber, 3.4 parts by weight wax per 100 parts by weight rubber, 1.94 parts by weight zinc oxide per 100 parts by weight rubber, 1.26 parts by weight stannous chloride per 100 parts by weight rubber, and 4.4 parts by weight phenolic resin per 100 parts by weight rubber. Table III provides the process characteristics on a larger diameter twin screw extruder.

The analytical procedures employed to perform physical testing on each thermoplastic vulcanizate sample included the following.

The surface spot count provides a quantitative measurement of the surface spots of an extruded elastomeric strip through the use of a visual inspection standard. In performing the test, a 1 inch or 1½ inch diameter extruder equipped with a 24:1 length/diameter screw having a 3-3.5 compression ratio was used. The extruder is fitted with a strip die that is 25.4 mm wide×0.5 mm thick×7-10 mml and length. A breaker plate is used with the die, but no screen pack is placed in front of the breaker plate. In preparing the extrudate, a temperature profile is employed to give a melt temperature of 200° C.±3° C. A hand-held temperature probe should be used to establish the melt temperature. With the extruder having three temperature zones within the feed zone, zone 1 should be set to 180° C., zone 2 should be set to 190° C., and zone 3 should be set to 200° C. The fourth zone, which is the die zone, should be set to 205° C. These temperatures should be controlled to ±6° C. When the zone temperatures have reached their set points, the screw should be started and about 1 kg of the sample should be loaded into the feed hopper. The extruder screw speed should be set to maintain an output of approximately 50 g±5 g per minute. The material was flushed through the extruder for at least five minutes before collecting any sample.

TABLE II (a)

| | Examples | | | | | | | |
|---|---|---|---|---|---|---|---|---|
| | 1C | 2C | 3C | 4C | 5 | 6 | 7 | 8 |
| Materials | PHR | PHR | PHR | PHR | PHR | PHR | PHR | PHR |
| EPDM | 175 | | | | | | | |
| GPR I | | 118 | 118 | 118 | 118 | 118 | 118 | 118 |
| PP I | 36.9 | 36.6 | 36.6 | 36.6 | 36.6 | 36.6 | 30.6 | |
| PP II | | 6.7 | 6.7 | 6.7 | 6.7 | 6.7 | 6.7 | 6.7 |
| PP III | | | | | | | 6 | 6 |
| PP IV | | | | | | | | 30.6 |
| Zinc Oxide | 2 | 2 | 2 | 2 | 2 | 2 | 2 | 2 |
| Stannous Chloride | 1.26 | 1.26 | 1.26 | 1.26 | 1.26 | 1.26 | 1.26 | 1.26 |
| Filler | 42 | 42 | 42 | 42 | 42 | 42 | 42 | 42 |
| Wax | 3.4 | 3.4 | 3.4 | 3.4 | 3.4 | 3.4 | 3.4 | 3.4 |
| Black | 24.4 | | | | | | | |

TABLE II (b)

Curative and Oil Injection

| | | | Examples | | | | | | | |
|---|---|---|---|---|---|---|---|---|---|---|
| Materials | Mixing elements after the curative or oil injections | Oil Feed Location* | 1C PHR | 2C PHR | 3C PHR | 4C PHR | 5 PHR | 6 PHR | 7 PHR | 8 PHR |
| Curative I | 3xZME15/30, KB60/3/30, KB60/3/60 | 20.0 | 4.4 | 4.4 | 4.4 | 4.4 | 4.4 | 4.4 | 4.4 | 4.4 |
| Process Oil | ZME15/30, KB60/3/30, KB60/3/60 | 7.0 | 4 | 25 | 39 | 64 | 18 | 9 | 9 | 9 |
| Process Oil | KB30/5/30, KB60/3/30 | 10.6 | | 15 | 15 | 15 | 36 | 45 | 45 | 45 |
| Process Oil | ZME15/30, 2xKB60/3/30 | 29 | 56 | 95 | 81 | 56 | 81 | 81 | 81 | 81 |
| Surface Properties | | | | | | | | | | |
| ESR microinch (micrometer) | | | 70 (1.78) | 98 (2.49) | 108 (2.74) | 117 (2.97) | 88 (2.24) | 89 (2.26) | 106 (2.69) | 69 (1.75) |
| Surface Spot Count | | | 84 | >100 | >100 | >100 | 21 | 2 | 12 | 6 |

*L/D from feed throat

Extrusion surface roughness (ESR) in microinches (micrometers) was measured as described in Chemical Surface Treatments of Natural Rubber And EPDM Thermoplastic Elastomers: Effects on Friction and Adhesion, RUBBER CHEMISTRY AND TECHNOLOGY, Vol. 67, No. 4, p. 586 (1994). The rating for each sample was determined by using a stylus profilometer.

Table II(b) provides characteristics of the process with different rubber or oil injection parameters. With example 1, a standard EPDM exhibited high surface spot count. With examples 2, 3, 4 the use of oil in the first injection was higher than 25 phr. Surface Spot count best illustrates the differences obtained with the invention compositions.

Table III illustrates examples prepared with a Coperion ZSK 83 twin screw extruder with an L/D of 46. The surface count spot count is well below 100 for each.

TABLE III

| | | Examples | | |
|---|---|---|---|---|
| Mixing elements after the curative or oil injections | Oil Feed Location* | 9 PHR | 10 PHR | 11 PHR |
| GPR III | | 0 | 118 | 118 |
| GPR IV | | 0 | | 118 |
| PP I | | 0 | 36.9 | 36.9 | 36.9 |
| PP II | | 0 | 6.7 | 6.7 | 6.7 |

TABLE III-continued

| | Mixing elements after the curative or oil injections | Oil Feed Location* | Examples | | |
|---|---|---|---|---|---|
| | | | 9 PHR | 10 PHR | 11 PHR |
| Zinc Oxide | | 0 | 1.9 | 1.9 | 1.9 |
| Stannous Chloride | | 0 | 1.26 | 1.26 | 1.26 |
| Filler | | 0 | 42 | 42 | 42 |
| Wax | | 0 | 3.4 | 3.4 | 3.4 |
| Curative II | 3xZME20/40, KB60/3/45, KB60/3/90 | 21.6 | 9.4 | 9.4 | 9.4 |
| Process Oil | KB30/5/60 | 5.6 | 9 | 19 | 19 |
| Process Oil | KB30/5/60, KB30/5/90 | 11.4 | 45.0 | 35.0 | 35.0 |
| Process Oil | ZME20/40, KB30/5/30, 2xKB60/3/45 | 28.9 | 74.3 | 74.3 | 74.3 |
| Surface Properties | | | | | |
| ESR | | | 79 (2.01) | 113 (2.87) | 78 (1.98) |
| Spot Count | | | 55 | 47 | 39 |

*L/D from feed throat

Table IV illustrates comparative examples prepared with a Coperion ZSK 53 twin screw extruder with an L/D of 43. In each of these examples, the oil was added in two positions, and without a dispersive element(s) after the distributive element(s). ESR was high, the surface was rough.

TABLE IV

| Feed Materials | Injection Location* | Mixing elements after oil injections | Examples | | | |
|---|---|---|---|---|---|---|
| | | | 12C | 13C | 14C | 15C |
| GPR II | 0 | | 118 | 118 | 118 | 118 |
| PP IV | 0 | | 57 | 57 | 219 | 219 |
| Zinc Oxide | 0 | | 2 | 2 | 2 | 2 |
| Stannous Chloride | 0 | | 1.26 | 1.26 | 1.26 | 1.26 |
| Filler | 0 | | 42 | 42 | 42 | 42 |
| Curative I | 14.2 | | 5.5 | 5.5 | | |
| Curative I | 22.1 | | | | 6 | 6 |
| Process Oil | 10.6 | KB30/5/30, SME45/45, KB30/5/30LH, KB60/3/30 | 52 | 52 | 52 | 52 |
| Process Oil | 29.4 | KB30/5/30, 3xZME 15/30, KB30/5/30LH | 78 | 58 | 78 | 58 |
| Surface Properties | | | | | | |
| ESR | | | 407 (10.34) | 388 (9.86) | 179 (4.55) | 247 (6.27) |

*L/D from feed throat

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

We claim:

1. A process for the preparation of dynamically vulcanized thermoplastic elastomers comprising melt processing under shearing conditions in melt reaction extruder, A) at least one thermoplastic resin that is a polypropylene homopolymer, B) at least one vulcanizable gas-phase elastomer having a Mooney viscosity ($ML_{1+4}(125°$ C.)) of from about 80 to about 200, C) at least one curing agent that is a phenolic resin, and D) process oil, wherein said process oil D) is added to the extruder in at least three oil injection positions located:

a) at least one location within the first 15% of the total length of the extruder;

b) at least one other location prior to, at or within 10% total extruder length after the onset of the vulcanization of said gas-phase elastomer; and c) at least one location subsequent to the point at which the vulcanization of said gas-phase elastomer is substantially completed; and wherein the direct oil injection locations into the extruder are positioned at or immediately before one or more distributive mixing elements, which distributive mixing elements are immediately followed by one or more dispersive mixing elements, and wherein 9-18 phr oil is added in (a), 36-45 phr oil is added in (b), and 74.3-81 phr oil is added in (c).

2. The process of claim 1 wherein the oil is heated before added into the extruder.

3. The process of claim 1 wherein a curative in diluted liquid or molten state is injected prior to the b) onset of vulcanization and into injection locations in the extruder positioned at or immediately before one or more distributive mixing elements, which distributive mixing elements are immediately followed by one or more dispersive mixing elements.

4. The process of claim 3, wherein approximately 40% to 60% of the process oil is added prior to injection position c), and approximately 60% to 40% of the process oil is added after the curing agent.

5. The process of claim 1 wherein said thermoplastic resin comprises at least one crystallizable polyolefin.

6. The process of claim 5 wherein said polyolefin is a propylene polymer having a Tm (DSC) 150° C. to 175° C., and melt flow rate (ASTM-D 1238) less than 10 dg/min.

7. The process of claim 1 wherein said gas-phase elastomer is an ethylene, propylene rubber, or an ethylene-propylene-diene monomer rubber.

8. The process of claim 7 wherein said gas-phase elastomer comprises 15-90 mol. % ethylene, 10-85 mol. % propylene, and optionally, 0.1 to 5 mol. % diene monomer.

9. A process for the preparation of dynamically vulcanized thermoplastic elastomers comprising melt processing under shearing conditions in melt reaction extruder, A) at least one thermoplastic resin, B) at least one vulcanizable gas-phase elastomer having a Mooney viscosity ($ML_{1+4}$(125° C.)) of from about 65 to about 450, C) at least one curing agent, and D) process oil, wherein said process oil D) is added to the extruder in at least three oil injection positions located:

a. at least one location within the first 15% of the total length of the extruder;
b. at least one other location prior to, at or within boo total extruder length after the onset of the vulcanization of said gas-phase elastomer; and
c. at least one location subsequent to the point at which the vulcanization of said gas-phase elastomer is substantially completed; and wherein the direct oil injection locations into the extruder are positioned at or immediately before one or more distributive mixing elements, which distributive mixing elements are immediately followed by one or more dispersive mixing elements, wherein 9-18 phr oil is added in a), 36-45 phr oil is added in b), and 74.3-81 phr oil is added c), and wherein the total amount of oil added in a)-c) is less than or equal to 160 phr oil, wherein a curative in diluted liquid or molten state is injected prior to the b) onset of vulcanization and into injection locations in the extruder positioned at or immediately before one or more distributive mixing elements, which distributive mixing elements are immediately followed by one or more dispersive mixing elements, and wherein approximately 40% to 60% of the process oil is added prior to injection position c), and approximately 60% to 40% of the process oil is added after the curing agent.

10. The process of claim 9, where the thermoplastic resin is a polypropylene homopolymer.

11. The process of claim 9, where the curing agent is a phenolic resin.

* * * * *

UNITED STATES PATENT AND TRADEMARK OFFICE
CERTIFICATE OF CORRECTION

| | | |
|---|---|---|
| PATENT NO. | : 7,655,727 B2 | Page 1 of 1 |
| APPLICATION NO. | : 11/297937 | |
| DATED | : February 2, 2010 | |
| INVENTOR(S) | : Ellul et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this

Twenty-third Day of November, 2010

David J. Kappos
*Director of the United States Patent and Trademark Office*